United States Patent
Hwang et al.

(10) Patent No.: US 7,082,108 B2
(45) Date of Patent: Jul. 25, 2006

(54) APPARATUS AND METHOD FOR CONTROLLING TRANSMISSION POWER IN AN NB-TDD CDMA COMMUNICATION SYSTEM

(75) Inventors: Sung-Oh Hwang, Yongin-shi (KR); Sung-Ho Choi, Songnam-shi (KR); Kook-Heul Lee, Songnam-shi (KR); Byung-Jae Kwak, Songnam-shi (KR); Sung-Jin Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 995 days.

(21) Appl. No.: 10/046,881

(22) Filed: Jan. 15, 2002

(65) Prior Publication Data

US 2002/0196766 A1 Dec. 26, 2002

(30) Foreign Application Priority Data

Jan. 15, 2001 (KR) ................... 2001-2131

(51) Int. Cl.
*G08C 17/00* (2006.01)

(52) U.S. Cl. ............ 370/311; 370/335; 370/342; 455/522; 455/69

(58) Field of Classification Search .......... 370/318, 370/317, 335, 342, 337, 347, 311; 455/522, 455/69

See application file for complete search history.

(56) References Cited

U.S. PATENT DOCUMENTS

| | | | |
|---|---|---|---|
| 5,566,165 A | 10/1996 | Sawahashi et al. | |
| 5,570,353 A | 10/1996 | Keskitalo et al. | |
| 6,035,210 A | 3/2000 | Endo et al. | |
| 6,173,188 B1 | 1/2001 | Kim | |
| 6,603,797 B1 * | 8/2003 | Zeira et al. | 375/130 |
| 6,628,956 B1 * | 9/2003 | Bark et al. | 455/522 |
| 6,993,063 B1 * | 1/2006 | Zeira et al. | 375/130 |

FOREIGN PATENT DOCUMENTS

| | | |
|---|---|---|
| DE | 195 33 507 | 9/1995 |
| EP | 0 991 203 | 4/2000 |

OTHER PUBLICATIONS

German Search Report dated May 19, 2003, issued in a counterpart application, namely, Appln. No. 102 01 270.9.
Eero Nikula, "FRAMES Multiple Access for UMTS and IMT-2000," IEEE Personal Communications, Apr. 1998, pp. 16-24.

* cited by examiner

*Primary Examiner*—Ricky Q. Ngo
*Assistant Examiner*—Nguyen H. Ngo
(74) *Attorney, Agent, or Firm*—Dilworth & Barrese, LLP

(57) ABSTRACT

A TDD (Time Division Duplexing) CDMA (Code Division Multiple Access) communication system performs power control in a closed-loop power control mode in a data transmission period, but performs the power control using a modified open loop power control method and an open loop power control method as well as the closed-loop power control method in a transmission pause period, thereby to properly set initial transmission power after the end of the transmission pause period.

13 Claims, 7 Drawing Sheets

APPARATUS AND METHOD FOR CONTROLLING TRANSMISSION POWER IN AN NB-TDD CDMA COMMUNICATION SYSTEM

PRIORITY

This application claims priority to an application entitled "A Power Control Method in Narrow Band Time Division Duplexing Code Division Multiple Access Communication" filed in the Korean Industrial Property Office on Jan. 15, 2001 and assigned Serial No. 2001-2131, the contents of which are hereby incorporated by reference.

BACKGROUND OF THE INVENTION

1. Field of the Invention

The present invention relates generally to an NB-TDD (Narrow Band Time Division Duplexing) CDMA (Code Division Multiple Access) communication system, and in particular, to an apparatus and method for controlling transmission power upon the occurrence of a transmission pause.

2. Description of the Related Art

In general, a $3^{rd}$ generation mobile communication system may be classified as an FDD (Frequency Division Duplexing) communication system which distinguishes uplink transmission from downlink transmission based on frequency, and as a WB/NB-TDD (Wide Band/Narrow Band Time Division Duplexing) communication system which separates uplink transmission from downlink transmission based on time. The WB-TDD communication system and the FDD communication system use a chip rate of 3.84 MHz, while the NB-TDD communication system uses a chip rate of 1.28 MHz.

In the NB-TDD communication system, communication between a UE (User Equipment) and a Node B is performed through a channel allocated between them. As data is discontinuously (or burstly) transmitted through the channel on a time division basis, long transmission pauses may occur. Thus, when an uplink or downlink transmission signal is transmitted after each transmission pause, its initial transmission power may not be at a proper level due to the transmission pause.

As stated above, the $3^{rd}$ generation asynchronous mobile communication system employing a time division technique includes the WB-TDD system and the NB-TDD system. A main difference between the WB-TDD system and the NB-TDD system lies in a chip rate: the WB-TDD system uses a chip rate of 3.84 MHz, while the NB-TDD system uses a chip rate of 1.28 MHz. Further, the WB-TDD system and the NB-TDD system use an uplink/downlink transmission power control method for maximally controlling interferences between the UEs in a Node B and interferences to another Node B. A difference in a transmission power control method between the WB-TDD system and the NB-TDD system will be described therein below.

First, a description will be made of a transmission power control method for the WB-TDD communication system.

The WB-TDD communication system uses an open loop power control method for uplink transmission power control, and a closed-loop power control method for downlink transmission power control. In the open loop control method used for controlling uplink transmission power of a UE in the WB-TDD communication system, the UE measures a propagation loss of a primary common control physical channel (P-CCPCH) transmitted from a Node B, and properly controls its uplink transmission power based on the measured propagation loss so that the Node B can correctly receive a channel signal transmitted by the UE. Here, the P-CCPCH is a channel for transmitting Node B information and system information (SI) to the UEs in the Node B. The P-CCPCH is transmitted at constant transmission power, and a transmission power level of the P-CCPCH is broadcast to the UEs in the Node B. The UE can measure the propagation loss from the Node B, using the broadcast information on the transmission power level of the P-CCPCH. Further, in the closed-loop power control method used for controlling downlink transmission power of the Node B in the WB-TDD communication system, the UE receives its signal from the Node B, and then measures a level (or a signal-to-interference ratio (SIR)) of the received signal. If the level of the signal received from the Node B is less than a predefined threshold, the UE transmits a TPC (Transmission Power Control) command ordering the Node B to increase its transmission power. In contrast, if the level of the signal received from the Node B is higher than or equal to the threshold, the UE transmits a TPC command ordering the Node B to decrease its transmission power. The Node B then controls downlink transmission power based on the TPC command received from the UE so that the transmission power received by the UE may have a constant level. This method is called the "closed-loop power control method". In other words, the WB-TDD communication system, as stated above, uses the closed-loop power control method for the downlink transmission power control and the open loop power control method for the uplink transmission power control.

However, unlike the WB-TDD communication system, the 3GPP ($3^{rd}$ Generation Partnership Project) TSG (Technical Special Group) RAN (Radio Access Network) TR (Technical Report) specifies that the NB-TDD communication system use the closed-loop power control method for both the uplink transmission power control and the downlink transmission power control. A main difference between the open loop power control method and the closed-loop power control method consists in whether or not to transmit the TPC command. In the WB-TDD communication system, since the closed-loop power control method is used only for the downlink transmission, the TPC command is transmitted through only the uplink. However, in the NB-TDD communication system, since the closed-loop power control method is used for both the uplink and downlink transmissions, the TPC command is transmitted through both the uplink and the downlink.

Next, an uplink/downlink transmission power control method for the NB-TDD system will be described herein below with reference to FIG. 1.

FIG. 1 illustrates a structure of a subframe for an NB-TDD communication system. Referring to FIG. 1, one subframe has a length of 5 ms, and 2 subframes constitute one frame. Thus, the frame has a length of 10 ms, and becomes a radio frame, a basic radio transmission unit, in the $3^{rd}$ generation mobile communication system. The 10 ms-radio frame becomes a basic radio transmission unit commonly used in the FDD, WB-TDD and NB-TDD communication systems.

The subframe is comprised of 7 time slots TS0–TS6, a downlink pilot time slot (DwPTS, or downlink pilot channel (DwPCH)) 102, an uplink pilot time slot (UpPTS, or uplink pilot channel (UpPCH)) 104, and a guard period (GP) 103. Of the time slots TS0–TS6, time slots TS0 and TS4–TS6 represented by down arrows are downlink time slots transmitted from the Node B to the UE, while time slots TS1–TS3 represented by up arrows are uplink time slots transmitted from the UE to the Node B. Since the NB-TDD communication system switches from the uplink transmission to the downlink transmission and vice versa in a time slot unit, it allocates the time slots of the subframe for the uplink transmission and the downlink transmission according to the following rules.

In the subframe structure, the first time slot (TS0) 101 must be fixedly used for downlink transmission, and the DwPTS 102 is a period for which the Node B transmits a predetermined code sequence to the UE so that the UE can acquire downlink synchronization. The UpPTS 104 is a period for which the UE transmits a predetermined code sequence to the Node B for uplink synchronization. Further, a switching point (SP) 110 represents a point where the downlink transmission is switched. The GP 103 is a non-transmission period established to prevent interference between the DwPTS 102 and the UpPTS 104 due to a possible overlap between them. A switching point 111 is a time point for separating uplink transmission from downlink transmission of the time slots other than the first time slot (TS0) 101. Here, the switching point 111 is variably set up such that the number of uplink slots is larger than the number of downlink slots when there is a greater amount of the uplink transmission data, while the number of downlink slots is larger than the number of uplink slots when there is a greater amount of the downlink transmission data.

FIG. 2 illustrates a method for allocating uplink/downlink channels to UEs by a Node B in the NB-TDD communication system. For simplicity, it will be assumed in FIG. 2 that one Node B allocates an uplink/downlink channel to one UE. Referring to FIG. 2, there are shown a $1^{st}$ radio frame 201, a $2^{nd}$ radio frame 202, a $(K-1)^{th}$ ratio frame 203 and a $K^{th}$ radio frame 204. Each radio frame is comprised of two subframes. That is, the $1^{st}$ radio frame 201 is comprised of a $1^{st}$ subframe 211 and a $2^{nd}$ subframe 212; the $2^{nd}$ radio frame 202 is comprised of a $1^{st}$ subframe 221 and a $2^{nd}$ subframe 222; the $(K-1)^{th}$ radio frame 203 is comprised of a $1^{st}$ subframe 231 and a $2^{nd}$ subframe 232; and the $K^{th}$ radio frame 204 is comprised of a $1^{st}$ subframe 241 and a $2^{nd}$ subframe 242.

In FIG. 2, if the UE sends a channel allocation request to the Node B or the Node B is required to allocate a channel to the UE, the Node B informs the UE of such resources as radio frame, subframe, time slot and channelization code to be used for the uplink transmission and such resources as radio frame, subframe, time slot and channelization code to be used for the downlink transmission. Of the resources used for the channel allocation, the channelization code is an orthogonal code. For downlink transmission, the orthogonal code serves to distinguish a downlink transport channel allocated to a specific UE from the downlink channels allocated to the other UEs using the same time slot by allocating different orthogonal codes to the respective UEs. For uplink transmission, the Node B uses the orthogonal codes in identifying the different UEs using the same time slot. Of course, for the uplink/downlink transmission through the orthogonal code, two or more different orthogonal codes can be allocated to the same UE to increase a data rate of the downlink transmission to the UE and the interference uplink transmission from the UE. Further, an OVSF (Orthogonal Variable Spreading Factor) code used in the $3^{rd}$ generation asynchronous mobile communication systems is typically used for the channelization code used in the NB-TDD communication system. Here, the OVSF code is characterized in that its length is variable according to a spreading factor (SF) for data spreading. For example, if the spreading factor is 4 (SF=4), a data band is expanded 4 times. In this case, a length of the channelization code in use becomes 4, and 4 available (SF=4) channelization codes are generated. Data spreading factors used in the NB-TDD communication system are 1, 2, 4, 8 and 16, and as the spreading factor increases more and more, a data rate of the transmission data decreases.

In FIG. 2, a method for determining uplink/downlink channels between the Node B and the UE is to establish a downlink channel with some of the time slots used for the downlink transmission among the time slots of the subframe 211 and a specific channelization code, and establish an uplink channel with some of the time slots used for the uplink transmission among the time slots of the subframe 211 and a specific channelization code. The uplink/downlink channels (time slots and channelization codes) established between the UE and the Node B are repeatedly used in a radio frame unit, and when necessary, the uplink/downlink channels (time slots and channelization codes) between the UE and the Node B can be reestablished. A repetition period of the uplink/downlink channels between the UE and the Node B and the number of radio frames, after which the reestablishment is to be performed, may depend upon the type and amount of the data exchanged between the UE and the Node B. In addition, when the uplink transmission data is larger in amount than the downlink transmission data, the uplink transport channel may be repeated more frequently than the downlink transport channel. In FIG. 2, the $K^{th}$ frame 204 is a frame where the data exchange between the UE and the Node B ends.

FIG. 3 illustrates a typical structure of a time slot in the subframe. The time slot structure illustrated in FIG. 3 may be used for both the uplink transmission and the downlink transmission. Data symbols 311 and 317 are used for transmission of uplink or downlink transmission data, and TFCIs (Transport Format Combination Indicators) 312 and 316 serve to indicate a data rate of a downlink channel transmitted from the Node B to the UE, or data rates of channelization codes for transmitting a downlink channel and the type of data. Further, for the uplink channel, the TFCIs have the same function as in the downlink channel. A midamble 313 is used to identify UEs using the same time slot, or identify downlink channels using the same time slot in the WB-TDD and NB-TDD communication systems. Further, for uplink/downlink transmissions, the midamble 313 is used for channel estimation, and for the downlink transmission, different midambles are used to measure a loss of channel propagation from the Node B to the UE. Alternatively, Node Bs may use different midambles for identification of the Node Bs. A specific sequence is used for the midamble 313, and the number of specific sequences used for the midamble is 128. The channelization codes and the midamble sequences described with reference to FIG. 2 have different characteristics and types, and this will be described for the uplink transmission, with reference to FIG. 3. For the uplink transmission, the channelization code, an orthogonal code, is used for the data symbols 311 and 317, and serves to distinguish data of the UEs, transmitted with the data symbols 311 and 317. A midamble 313 serves to identify which UE is transmitting data, and the midamble 313 is not subject to band expansion with a channelization code.

In addition, SS (Synchronization Shift) 314 is used to transmit a synchronization control command, when synchronization between the UE and the Node B has failed due to a change in the distance between the UE and the Node B during signal transmission, or for other reasons. In response to the command transmitted through the SS 314, the UE can control a transmission point in a ¼-chip unit. Further, GP 318 is a period for separating the current time slot from the next time slot. The GP 318 serves as a guard for preventing interferences between an uplink signal and a downlink signal, when the downlink transmission slot signal is received in the uplink transmission slot period or the uplink transmission slot signal is received in the downlink transmission slot period. Finally, TPC (Transmission Power Control) command 315 is used for controlling downlink transmission power of the Node B, when it is transmitted through the uplink, and the TPC 315 is used for controlling uplink transmission power of the UE, when it is transmitted through the downlink. Herein, a process for determining the TPC command 315 and then transmitting the determined TPC command will be separately described for the uplink transmission power control and the downlink transmission power control.

Uplink Transmission Power Control

In the uplink transmission power control process, the Node B correctly receives data transmitted from the UE through the uplink by controlling a level of the uplink transmission power transmitted by the UE, and controls the uplink transmission power so that the received data does not act as an interference to a signal transmitted from another UE to the Node B due to an excessively high level of the transmission power of the UE. In the NB-TDD communication system, for the uplink transmission power control, the Node B measures a signal-to-interference ratio (SIR) of a signal transmitted over a dedicated physical channel (DPCH) transmitted by the UE, and compares the measured SIR value with a predetermined target SIR value ($SIR_{target}$). In order to correctly receive the data transmitted over the uplink dedicated physical channel of the UE, the Node B transmits an uplink transmission power-down command to the UE, if the measured SIR value is larger than or equal to the target SIR value. However, if the measured SIR value is less than the target SIR value, the Node B transmits an uplink transmission power-up command to the UE. Further, the DPCH is a physical channel for transmitting user data and signaling information from an upper layer, and is used by only the UE designated by the Node B, and the other UEs do no share the DPCH allocated to a specific UE.

Downlink Transmission Power Control

In the downlink transmission power control process, the UE controls transmission power of a downlink signal from the Node B such that the UE can correctly receive the downlink signal without errors. The downlink transmission power control process is performed in the same manner as the uplink transmission power control process. That is, the UE measures SIR of a downlink DPCH signal from the Node B, and compares the measured SIR value with a predetermined target SIR value. As the result of the comparison, if the measured SIR value is less than the target SIR value, the UE transmits an uplink transmission power-up command to the Node B. Otherwise, if the measured SIR value is larger than or equal to the target SIR value, the UE transmits an uplink transmission power-down command to the Node B so that the Node B controls transmission power of a signal transmitted to the UE.

As described with reference to FIGS. 2 and 3, in the NB-TDD communication system, a dedicated channel between the Node B and the UE is allocated through time slot, channelization code and radio frame, and the TPC command is transmitted in a subframe unit. In the NB-TDD communication system, when the uplink/downlink channels between the UE and the Node B are established every subframe, the maximum frequency of transmitting the uplink/downlink TPC commands is 200 Hz; when the uplink/downlink channels between the UE and the Node B are established every radio frame, the maximum frequency of transmissions is 100 Hz; and when the uplink/downlink channels between the UE and the Node B are established every 10 radio frames, the maximum frequency of transmissions is 10 Hz. Further, in the NB-TDD communication system, the uplink/downlink channels between the UE and the Node B may not be equally established: the frequency of establishing the uplink transmission time slot is increased when there is a greater amount of uplink transmission data, and the frequency of establishing the downlink transmission time slot is increased when there is a greater amount of downlink transmission data. Therefore, the frequency of transmitting the uplink TPC command may not be equal to the frequency of transmitting the downlink TPC command.

Accordingly, in the NB-TDD communication system, using only the closed-loop power control method for transmission power control of the DPCH is inefficient in properly setting the uplink/downlink transmission power in the above-stated condition, i.e., in a situation where the uplink/downlink channels for the uplink/downlink transmissions between the UE and the Node B are established unequally or established discontinuously, disturbing smooth transmission of the TPC commands.

In addition, the NB-TDD communication system provides a shared channel in addition to the DPCH as a channel for transmitting user data or signaling information of an upper layer, and the shared channel is equal to the DPCH in a physical structure and a transmission power control method. The shared channel is classified into a downlink shared channel (DSCH) and an uplink shared channel (USCH). In particular, the shared channel can be efficiently used for a packet data service. Unlike the dedicated channel, the shared channel is used by a plurality of UEs by sharing radio resources (e.g., channelization code, time slot and midamble). The packet data is generated on a burst basis (or burstly) in light of its property, and the packet data can be transmitted discontinuously using the shared channel since it is not susceptible to transmission time delay. Therefore, in the case where the transmission power of the shared channel is controlled in the closed-loop power control method as in the DPCH, a period for transmitting the TPC signal may not exist for a long time if a non-transmission period between data blocks on the channel is increased, so that the data may not be normally transmitted.

SUMMARY OF THE INVENTION

It is, therefore, an object of the present invention to provide an apparatus and method for controlling transmission power of a dedicated physical channel in an NB-TDD communication system.

It is another object of the present invention to provide an apparatus and method for controlling transmission power of a shared channel in an NB-TDD communication system.

It is further another object of the present invention to provide an apparatus and method for controlling uplink/downlink transmission power upon occurrence of a transmission pause where no data is transmitted.

It is yet another object of the present invention to provide an apparatus and method for controlling transmission power of both a dedicated channel and a shared channel using a closed-loop power control method in an NB-TDD communication system.

It is still another object of the present invention to provide an apparatus and method for controlling transmission power of a dedicated channel and a shared channel, using an open loop power control method together with a closed-loop power control method in an NB-TDD communication system.

It is still another object of the present invention to provide an apparatus and method for controlling transmission power of a dedicated physical channel and a shared physical channel using a closed-loop power control method in an NB-TDD communication system employing a beam forming technique.

It is still another object of the present invention to provide an apparatus and method for controlling transmission power of a dedicated physical channel and a shared physical channel using an open loop power control method together with a closed-loop power control method in an NB-TDD communication system supporting a beam forming technique.

To achieve the above and other objects, there is provided a transmission power control apparatus in a UE for a TDD CDMA communication system which transmits a stream of frames from a Node B to the UE, each of the frames including a field indicating power level information transmitted from the Node B and a time slot field for allocating a TPC command and transmission data from the Node B to the UE, wherein the UE receives data transmitted from the Node B, allocated to a time slot field in a following frame after a transmission pause period where no transmission data exists in the time slot fields in specific frames among the stream of the frames transmitted from the Node B to the UE. Upon occurrence of the transmission pause from a specific channel signal received from the Node B, an uplink transmission power controller measures a propagation loss between the Node B and the UE based on power level information received at a specific time slot in the transmission pause period, detects an interference noise of the Node B from the specific channel signal, and determines uplink transmission power by summing up (i) values determined by applying a weight based on a length of the transmission pause period to the currently measured propagation loss and an average propagation loss between the Node B and the UE during the transmission pause period, (ii) a predetermined target SIR, and (iii) an offset for compensating for the propagation loss error. A downlink TPC command generator generates a downlink TPC command for controlling downlink transmission power to be transmitted by the Node B at the following frame by receiving uplink transmission power determined by the uplink transmission power controller. A multiplexer multiplexes the downlink TPC command, user data to be transmitted to the Node B, and a TFCI indicating a type and a data rate of the user data. A multiplier multiplies the uplink channel signal by a channel gain based on the determined uplink transmission power.

Further, to achieve the above and other objects, there is provided a transmission power control method in a UE for a TDD CDMA communication system which transmits a stream of frames from a Node B to the UE, each of the frames including a field indicating power level information transmitted from the Node B and a time slot field for allocating a TPC command and transmission data from the Node B to the UE, wherein the UE receives data transmitted from the Node B, allocated to a time slot field in a following frame after a transmission pause period where no transmission data exists in the time slot fields in specific frames among the stream of the frames transmitted from the Node B to the UE. The method comprises measuring a propagation loss between the Node B and the UE by receiving the power level information at a specific time slot in the transmission pause period; measuring an interference noise of the Node B by receiving a specific channel signal broadcast by the Node B; and determining uplink transmission power by summing up (i) values determined by applying a weight based on a length of the transmission pause period to the currently measured propagation loss and an average propagation loss between the Node B and the UE during the transmission pause period, (ii) a predetermined target signal-to-interference ratio (SIR) and (iii) an offset for compensating for the propagation loss error, and transmitting a TPC command corresponding to the determined uplink transmission power to the Node B.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the contents not closely related to the gist of the present invention will be omitted. However, for better understanding of the present invention, reference will be made to the contents adopted by or submitted to the 3GPP ($3^{rd}$ Generation Partnership Project). Although the present invention will be described with reference to an NB-TDD communication system, the invention can also be applied to other communication systems, which cannot smoothly control transmission power with only the closed-loop power control method, like the NB-TDD communication system. Embodiments of the present invention will be described with reference to a first case where a long downlink transmission pause occurs, a second case where both the long downlink and uplink transmission pauses occur, and a third case where a beam forming technique is used for the downlink transmission.

I. Downlink Transmission Pause being Longer than Uplink Transmission Pause

When there exists the long downlink transmission pause between UE and Node B or the downlink transmission pause is quite longer than the uplink transmission, the following problems occur. Here, "pause" refers to a period where no data is actually transmitted. Since there is the long downlink transmission pause from the Node B to the UE, a TPC command for controlling uplink transmission power of a UE, to be received over a downlink physical channel or a downlink shared channel, is not transmitted for the downlink transmission pause period. Therefore, it is not possible for the UE to determine uplink transmission power using the TPC command. Further, since there is no dedicated physical channel (DPCH) or a shared channel transmitted from the Node B, the UE cannot determine a TPC command for controlling transmission power of the downlink dedicated channel transmitted after the downlink transmission pause. Therefore, in order to solve the problems occurring when there is the downlink transmission pause, there is a need for a power control method in which the UE controls its uplink transmission power by itself during the downlink transmission pause, and controls initial downlink transmission power of the Node B after the downlink transmission pause. This power control method will be described with reference to first and second embodiments.

FIRST EMBODIMENT

Figure 1:
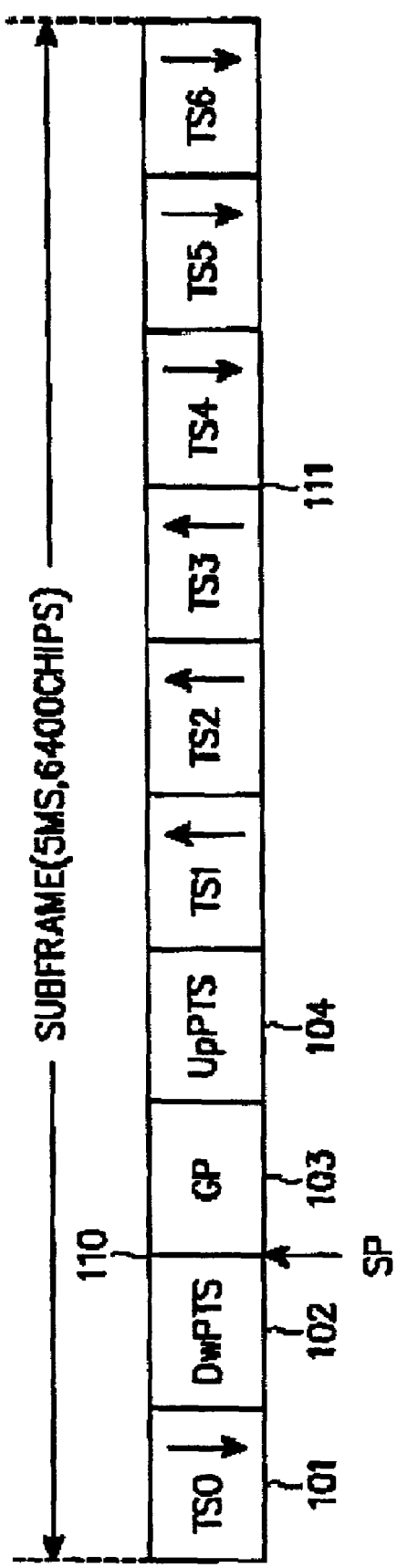
FIG. 1 illustrates a structure of a subframe for an NB-TDD communication system.
Figure 2:
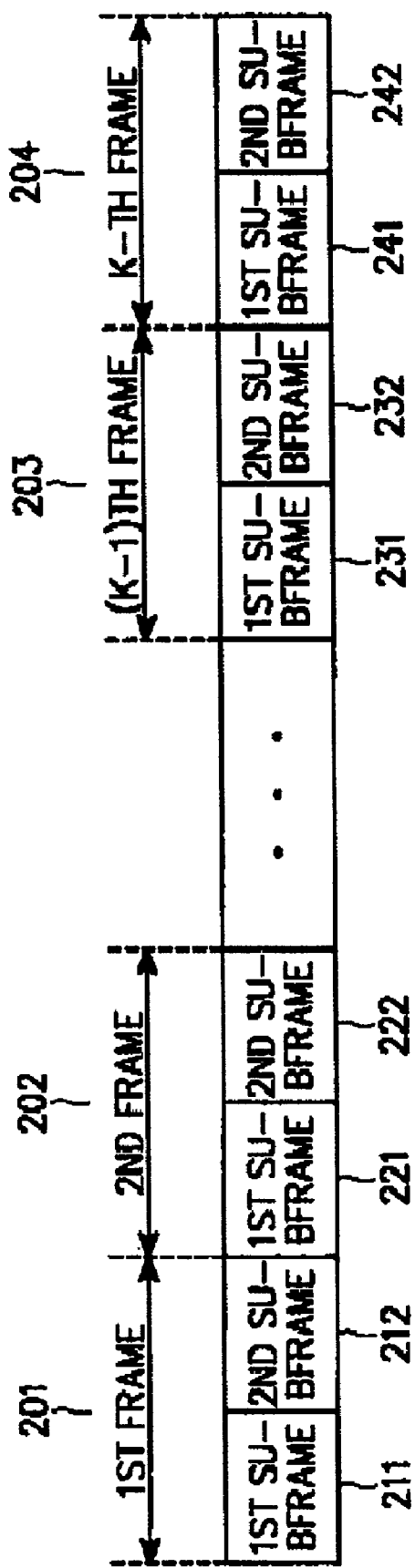
FIG. 2 illustrates a method for allocating uplink/downlink channels to UEs by a Node B in the NB-TDD communication system.
Figure 3:
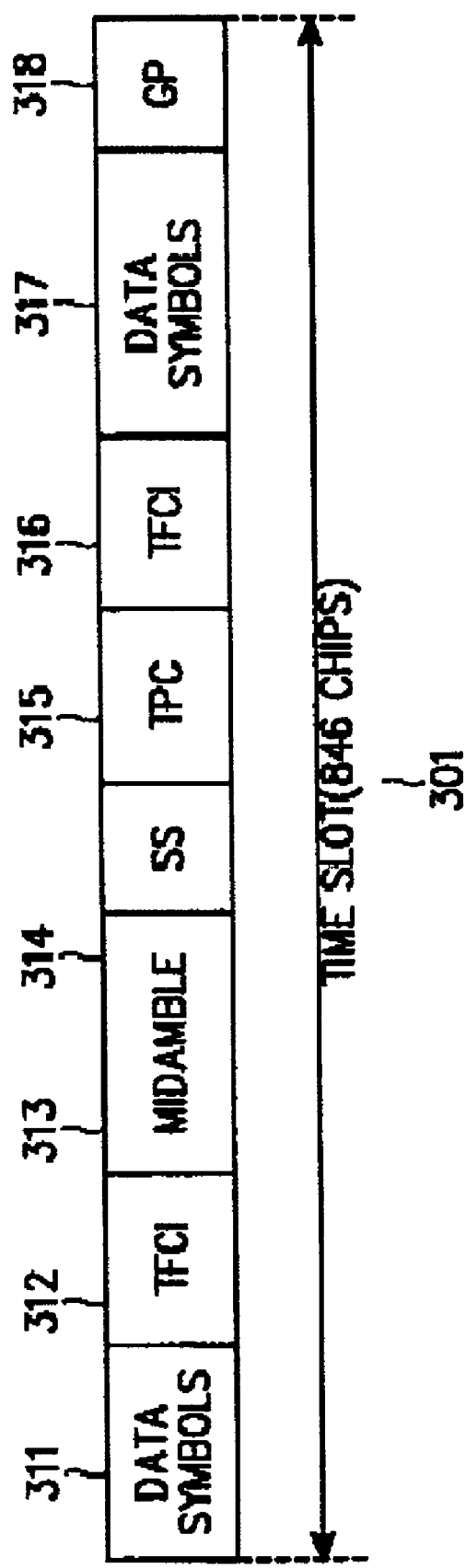
FIG. 3 illustrates a typical structure of a time slot in the subframe.

Since there exists no downlink dedicated channel or downlink shared channel transmitted from the Node B, the UE measures a propagation loss between the Node B and the UE by receiving a primary common control physical channel (P-CCPCH) transmitted from the Node B at a first time slot (TS0 101 of FIG. 1) of each subframe or radio frame. The UE determines its uplink transmission power by performing open loop transmission power control based on the measured propagation loss, determines a TPC command for controlling downlink transmission power using the propagation loss value, and transmits the determined TPC command to the Node B. The Node B then uses the TPC command received from the UE in setting initial transmission power of the downlink channel to be transmitted after the downlink transmission pause. A method for performing open loop power control by measuring a propagation loss of the P-CCPCH is represented by $$P_{UP} = \alpha L_{P\text{-}CCPCH} + (1-\alpha)L_0 + I_{BTS} + SIR_{target} + C \quad (1)$$

In Equation (1), $P_{UP}$ represents transmission power of an uplink channel transmitted from the UE to the Node B at a specific time slot, $L_0$ represents an average of P-CCPCH propagation losses measured by the UE, $L_{P\text{-}CCPCH}$ represents a currently measured P-CCPCH propagation loss, and $\alpha$ is a weight for the average propagation loss and the current measured propagation loss. Here, when the value $\alpha$ is larger, the transmission power of the UE is determined based on the currently measured propagation loss rather than the average propagation value. The value $\alpha$ is related to a length and a measurement unit of the downlink transmission pause. In the case where the measurement unit of the transmission pause is a time slot, if the transmission pause is 1 time slot, the transmission power of the UE is determined using only the currently measured propagation loss of the P-CCPCH. When the transmission pause becomes longer, the transmission power of the UE is determined by applying a weight to the average propagation loss of the P-CCPCH. Further, in the case where the measurement unit of the transmission pause is a frame, if the transmission pause is 1 frame, the transmission power of the UE can be determined using only the currently measured propagation loss of the P-CCPCH. In addition, when the transmission pause becomes longer, the transmission power of the UE can be determined using the average propagation loss of the P-CCPCH.

The $L_0$ and the $L_{P\text{-}CCPCH}$ are measured in decibel (dB) units, and a Node B transmission power level of the P-CCPCH is transmitted to the UEs in the Node B along with system information (SI) of a broadcasting channel transmitted over the P-CCPCH. $I_{BTS}$ represents a Node B interference noise measured by the Node B at every time slot, and the $I_{BTS}$ is also transmitted to the UEs through the broadcasting channel. $SIR_{target}$, a predefined target signal-to-interference ratio, is determined according to a data rate and the type of data transmitted over the dedicated channel. C, a constant, is a transmission power offset provided from the Node B to the UE. In the open loop transmission power control method, the UE corrects an error of the measured propagation loss of the P-CCPCH by adding a specific transmission power offset.

Here, $\alpha$ of Equation (1) can be calculated by $$\alpha = 1 - \frac{(D-1)}{k} \quad (2)$$

In Equation (2), D represents a transmission pause, and its expression is changed according to the measurement unit. That is, in the case where D=5, if the measurement unit is a time slot, D indicates a 5-time slot transmission pause; if the measurement unit is a subframe, D indicates a 5-subframe transmission pause; and if the measurement unit is a frame, D indicates a 5-frame transmission pause. Further, in Equation (2), k represents the maximum transmission pause for which $\alpha$ can be calculated by formula. An arbitrary value can be used for k and the value k has the same units as D. That is, when D is a time slot unit, k also is a time slot unit; when D is a subframe unit, k also is a subframe unit, and when D is a frame unit, k also is a frame unit.

In the first embodiment, the Node B determines initial transmission power of a downlink DPCH or an uplink DPCH to be transmitted after the end of the transmission pause, using a TPC command transmitted from the UE, as follows.

The Node B can reset the transmission power of the downlink transport channel by adding or subtracting a specific power level according to the TPC command received from the UE, on the basis of the transmission power of the downlink transport channel transmitted just before the downlink transmission pause. The process for resetting the transmission power of the downlink transport channel is represented by $$P_{DL}[k] = P_{DL}[k-1] + \Delta TPC \times TPC \quad (3)$$

Prior to a description of Equation (3), the NB-TDD communication system can control a transmission power control step every time slot, and 1, 2 and 3 dB are available for the transmission power control step. In Equation (3), the $\Delta TPC$ value can be determined depending on the interference noise $I_{BTS}$ measured by a Node B receiver at the corresponding time slot. That is, $\Delta TPC$ represents the transmission power control step to be applied to a $k^{th}$ time slot, and TPC represents a downlink TPC command transmitted from the UE. The Node B can reestablish the downlink channel to the UE that has transmitted the TPC command, using the TPC command transmitted from the UE and Equation (3), each time the TPC command is received from the UE, and when downlink transmission data is generated, the Node B transmits the downlink transmission data using the reset transmission power.

SECOND EMBODIMENT

The first embodiment has been described with reference to the uplink/downlink transmission power control method for the case where there exists the downlink transmission pause. Another transmission power control method for the case where there exists the downlink transmission pause is divided into one method for controlling the uplink transmission power.

First, one of the uplink transmission power control method according to the second embodiment of the present invention is represented by $$P_{UP} = P_{UP}[0] + L_1 - L_0 + TCP_{offset} \quad (4)$$

In Equation (4), $P_{UP}$ represents uplink transmission power of the UE, used by the UE as uplink transmission power just before the start of the downlink transmission pause, $L_1$ represents a propagation loss from the Node B to the UE, measured by the UE at a time slot just before the start of uplink transmission of the UE, and $L_0$ represents a propagation loss from the Node B to the UE, measured by the UE just before the start of the downlink transmission pause of the Node B. Further, the $TPC_{offset}$ value can be determined considering a TPC command received by the UE before the start of the downlink transmission pause and a change in the channel environment between the UE and the Node B, and as a result, $TPC_{offset}$ is represented by a constant. Here, "channel environment" refers to a change in the propagation loss from the Node B to the UE, measured by the UE. The reason for compensating for the propagation loss in addition to the $L_1$ and $L_0$ is because mere compensation for a difference of $L_1-L_0$ may cause a lack of transmission power of the UE, if the propagation loss is subject to an abrupt change.

Second, the other uplink transmission power control method according to the second embodiment of the present invention is represented by $$P_{UP} = P_{UP}[0] + L_1 - L_0 + TPC_{offset} + I_{BTS1} - I_{BTS0} \quad (5)$$

A difference between Equation (4) and Equation (5) consists in that the Node B receiver interference measured by the Node B receiver is used for uplink transmission of the UE after the downlink transmission pause when determining transmission power of the UE. In Equation (5), $I_{BTS1}$ is Node B receiver signal interference measured by the Node B just before the uplink transmission point, and is broadcast to the UE through the broadcasting channel transmitted over the P-CCPCH, and $I_{BTS0}$ is Node B receiver signal interference at a time slot just before the start of the uplink transmission pause.

The transmission power control methods according to the first and second embodiments of the present invention have been described with reference to the case where there exists the downlink transmission pause or the downlink transmission pause is longer than the uplink transmission pause. Next, the invention will be described with reference to the case where both the uplink transmission pause and the downlink transmission pause are both long.

II. Both Downlink Transmission Pause and Uplink Transmission Pause being Long

When both the downlink transmission pause and the uplink transmission pause are long, the TPC command is not transmitted at both the uplink transmission pause and the downlink transmission pause between the Node B and the UE, thus making it difficult to perform the closed-loop power control. In particular, when the uplink transmission pause and the downlink transmission pause are both long, the Node B has a high error probability when determining initial downlink transmission power after the end of the downlink transmission pause and determining initial uplink transmission power after the end of the uplink transmission pause. In order to solve this problem, the present invent ion provides the following three methods of setting initial uplink transmission power of the UE after the end of the uplink transmission pause.

The first method is to use the uplink transmission power setting method described in the first embodiment of the present invention, the second method is to use the uplink transmission power setting method described in the second embodiment of the present invention, and the third method is to use the first method together with the second method. The first method, i.e., the first embodiment, determines the uplink transmission power of the UE using the open loop power control method, and the second method, i.e., the second embodiment, determines the uplink transmission power of the UE using a modified closed-loop power control method. The third method supplements the closed-loop power control method and the open loop power control method in order to compensate for errors, which may occur in the first and second methods. The third method can be represented by $$P_{UP} = f(n) \times P_{UL1} + (1-f(n)) P_{UL2} \quad (6)$$

In Equation (6), $P_{UL1}$ is equal to $P_{UP}$ of Equation (1), and $P_{UL2}$ is equal to $P_{DL}$ of Equation (3). Further, f(n) is a function of a transmission pause 'n', and its unit is a radio frame or a subframe. When the transmission pause is longer, f(n) has a property of increasing a weight of the initial uplink transmission power determined in the open loop power control method. For example, f(n) is represented by a function of $f_n = 1/n$.

III. Beam Forming Transmission Technique being Used for Downlink

Transmission

In the NB-TDD communication system, if a transmission pause occurs during uplink/downlink transmissions under a condition where a special technique such as beam forming is used, the common closed-loop power control method will be used, since it is difficult to use the common open loop power control method. The reason for using the closed-loop power control method rather than the open loop power control method is because the P-CCPCH used in measuring a propagation loss in the open loop power control method is not subject to beam forming, while the DPCH or the shared channel transmitted from the Node B to the UE is subject to beam forming, so that a propagation loss that the DPCH and the shared physical channel experience is different from a propagation loss that the P-CCPCH undergoes.

The beam forming technique controls a transmission direction of a transmission beam and a direction of a reception antenna in a Node B so that the UE can more efficiently receive the dedicated channel signal transmitted by the Node B or the Node B can more efficiently receive the signal transmitted by the UE. Commonly, the propagation loss is in inverse proportion to a $4^{th}$ power of the distance between the Node B and the UE. However, when the beam forming technique is applied, the propagation loss is in inverse proportion to a $2^{nd}$ power of the distance between the Node B and the UE.

Therefore, the present invention provides a transmission power control algorithm used for setting uplink transmission power of the UE in the NB-TDD communication system employing the beam forming technique. The transmission power of the UE, applicable to the case where the beam forming technique is used, can be represented by $$P_{UP} = P_{UP}[0] + \beta(L_1 - L_0) + TPC_{offset} \quad (7)$$

$$P_{UP} = P_{UP}[0] + \beta(L_1 - L_0) + TPC_{offset} + I_{BTS1} - I_{BTS0} \quad (8)$$

Equations (7) and (8) are similar to Equations (4) and (5), respectively, except for a parameter β. The parameter β in Equation (7) is the same as that in Equation (8). Parameter β is a value for correcting a difference between a propagation loss of the DPCH or the shared physical channel subjected to beam forming and a propagation loss of the P-CCPCH not subjected to beam forming. The reason that parameter β is needed is because the UE controls its transmission power by receiving a TPC command transmitted over the downlink dedicated channel or the downlink shared physical channel before the downlink transmission pause, but it cannot receive the downlink TPC command during the downlink transmission pause, so transmission power must be set using another method. As a method for setting the transmission power, it was possible for the UE to measure a propagation loss of the P-CCPCH and use Equations (4) and (5). However, as stated above, since a propagation delay of the DPCH or the shared channel is different from that of the P-CCPCH due to beam forming, the difference between the propagation delay of the measured channel and the propagation delay of the actually transmitted channel is corrected using parameter β. Parameter β is represented by $$L_{DPCH} : L_{P-CCPCH} = \frac{A}{r^2} : \frac{A}{r^4} \quad (9)$$

where A represents Node B transmission power.

Equation (9) calculates a ratio of a propagation loss of the P-CCPCH to a propagation loss of the DPCH or the shared channel according to the distance between the UE and the Node B, and parameter β is determined by the calculated ratio. In Equation (9), r indicates the distance between the Node B and the UE. Since the DPCH or the shared channel is subjected to beam forming, its propagation loss is in inverse proportion to the second power of the distance r between the Node B and the UE. However, since the P-CCPCH is not subjected to beam forming, its propagation loss is in inverse proportion to the $4^{th}$ power of the distance r between the Node B and the UE.

Next, a transceiver structure of the UE and the Node B will be described with reference to FIGS. 4 and 5, assuming that an $i^{th}$ UE exchanges signals with the Node B.

Figure 4:
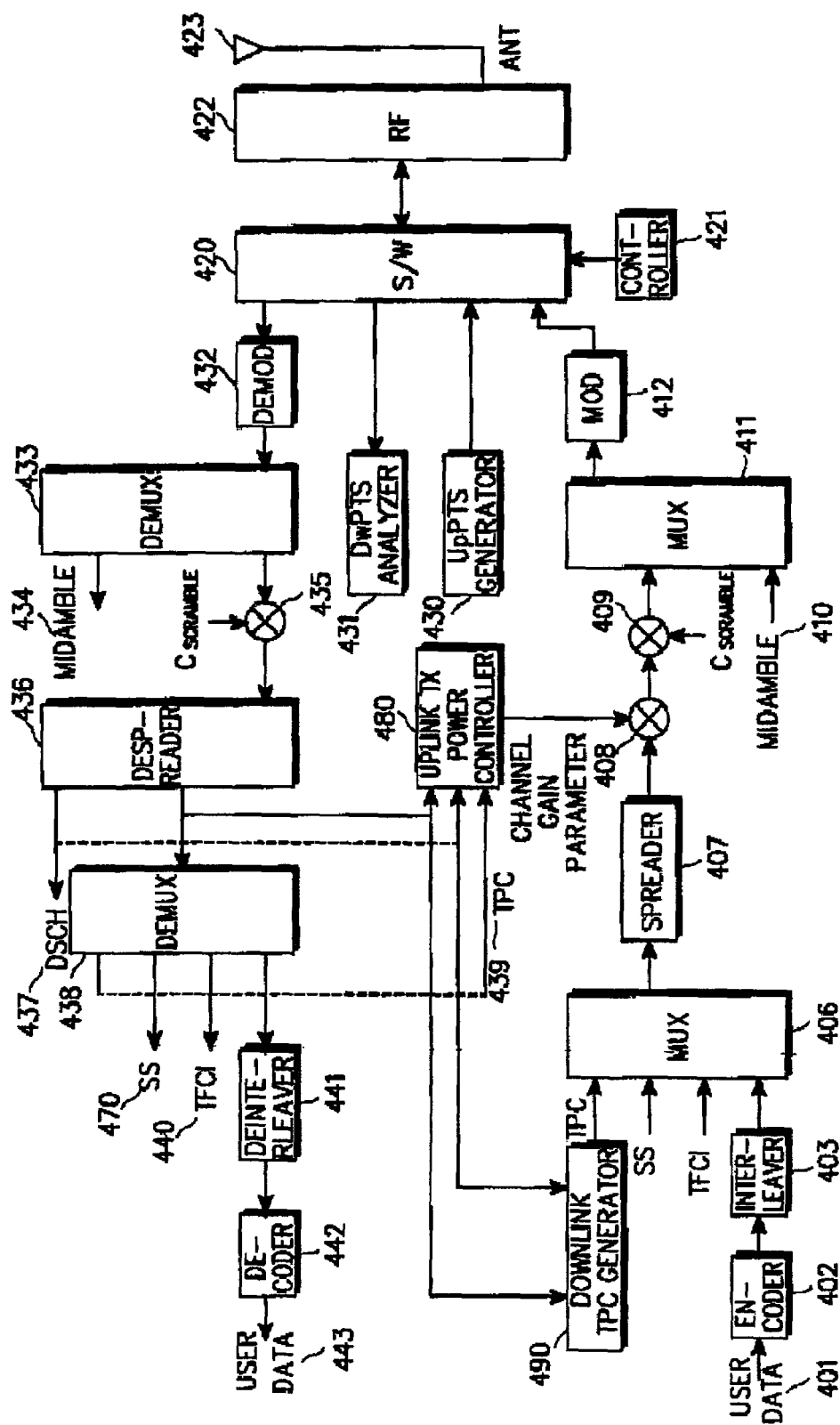
FIG. 4 illustrates a structure of a UE transceiver according to an embodiment of the present invention.

FIG. 4 illustrates a structure of a UE transceiver according to an embodiment of the present invention. Referring to FIG. 4, since the NB-TDD communication system uses the same frequency band for the uplink and downlink transmissions at different times, a transmitter and a receiver must be switched through a switch 420. An encoder 402 receives an $i^{th}$ user's data 401 to be transmitted to a Node B through the UE, and channel-codes the received user data 401 with a convolutional code or another channelization code. An interleaver 403 interleaves data output from the encoder 402 according to a predetermined rule and provides the interleaved data to a multiplexer 406. The interleaving rearranges the $i^{th}$ user's data output from the encoder 402 according to the predetermined rule, so as to spread possible narrow-band interference after deinterleaving to minimize the influence of the narrow-band interference.

The multiplexer 406 multiplexes the $i^{th}$ user's data output from the interleaver 403, TPC 405, TFCI 404 and SS 460 into a time slot (hereinafter, referred to as an "$i^{th}$ user's data part") used by the NB-TDD communication system, and provides the $i^{th}$ user's data part to a spreader 407.

The TPC 405, a transmission power control command for controlling downlink transmission power from the Node B to the UE, is created by a downlink TPC command generator 490. When there exists no downlink transmission pause, the downlink TPC command generator 490 compares a signal-to-interference ratio (SIR) measured through an $i^{th}$ user's dedicated channel or shared physical channel output from a despreader 436 with a target SIR ($SIR_{target}$). If the measured SIR is larger than or equal to the target SIR, the downlink TPC command generator 490 generates a downlink power-down command; otherwise, if the measured SIR is less than the target SIR, the downlink TPC command generator 490 creates a downlink power-up command.

However, upon occurrence of a downlink transmission pause, the downlink TPC command generator 490 generates a TPC command by measuring a propagation loss of the P-CCPCH in a downlink shared channel (DSCH) 437 output from the despreader 436. The TPC command 405 is transmitted to the Node B, so that the Node B can reset downlink transmission power to be used after the end of the downlink transmission pause, even during the downlink transmission pause. Further, the TFCI 404 is a codeword used to indicate data rates of a variety of data mixed with the $i^{th}$ user's data transmitted by the UE. The SS 460 is a command used to control synchronization of a downlink signal.

The spreader 407 receives the $i^{th}$ user's data part created by the multiplexer 406, spreads the $i^{th}$ user's data part by multiplying it by a channelization code, and provides its output to a multiplier 408. Here, an OVSF code is used for the channelization code used in the NB-TDD communication system, and the OVSF code is an orthogonal code, a length of which is determined according to a data rate. The channelization code serves to distinguish an uplink channel of each UE, when a plurality of UEs simultaneously transmit data in the NB-TDD communication system, and also spread a transmission band of the user data according to its length.

The multiplier 408 multiplies a signal output from the spreader 407 by a channel gain parameter and provides its output to a multiplier 409. Here, the channel gain parameter is created by an uplink transmission power controller 480 to determine a transmission parameter of the $i^{th}$ user's uplink channel. When there is no downlink transmission pause, the channel gain parameter is determined depending on the type of the data transmitted through the $i^{th}$ user's data part and a TPC command transmitted from the Node B. However, upon occurrence of the downlink transmission pause, the channel gain parameter is determined by Equations (1), (4) and (5). When there is no downlink transmission pause, the uplink transmission power controller 480 generates the channel gain parameter based on a TPC command 439 output from a demultiplexer 438. However, upon the occurrence of the downlink transmission pause, the uplink transmission power controller 480 generates the channel gain parameter using a propagation loss of the P-CCPCH in the downlink shared channel (DSCH) 437 output from the despreader 436.

The multiplier 409 scrambles a signal output from the multiplier 408 by multiplying it by a scrambling code $C_{SCRAMBLE}$, and provides its output to a multiplier 411. Here, the scrambling code $C_{SCRAMBLE}$ is used for identification of the Node B and the UE, and reduction in cross correlation of multi-path signals. In the NB-TDD communication system, the scrambling code is used only for identification of the Node B and reduction in the cross correlation. In the NB-TDD communication system, each Node B uses its own unique scrambling code, and the scrambling code is used for both the uplink transmission and the downlink transmission. The multiplexer 411 multiplexes a signal output from the multiplier 409 and a midamble 410 into an $i^{th}$ user's uplink channel, a basic transmission unit of which is a time slot. The $i^{th}$ user's uplink channel is comprised of user data 401, TPC 405, TFCI 404, midamble 410 and a GP (Guard Period). The midamble 410 is used for channel estimation and multi-user detection supported by the NB-TDD communication system, and the GP is a period created to prevent an interference noise between uplink and downlink transmission signals due to an overlap of an uplink time slot and a downlink time slot in the NB-TDD communication system. Actually, no data is transmitted in the guard period.

A modulator 412 modulates the $i^{th}$ user's uplink channel output from the multiplexer 411 in a predetermined modulation mode, and provides its output to the switch 420. Here, the modulation technique includes QPSK (Quadrature Phase Shift Keying), 8PSK (8-ary Phase Shift Keying), and QAM (Quadrature Amplitude Modulation). The switch 420 is switched ON to transmit the $i^{th}$ user's uplink channel output from the modulator 412 to the Node B at a time slot where the $i^{th}$ user's uplink channel is to be transmitted. The switch 420 is controlled by a controller 421, which controls a transmission point of the uplink channel. Based on the subframe structure of the NB-TDD communication system, the controller 421 controls a transmission point of an uplink pilot time slot (UpPTS), a transmission point of a downlink pilot time slot (DwPTS), and an arrival point of a downlink channel from the Node B to the UE. Here, the UpPTS is created by an UpPTS generator 430. The UpPTS is transmitted when the UE needs to be allocated a channel from the Node B, or in a handover state, and the UpPTS is used by the Node B in controlling a criterion for determining uplink transmission power of the UE or controlling uplink transmission synchronization. The UE receives the DwPTS during its initial search for the Node B, and the DwPTS indicates a position of the P-CCPCH, where the broadcasting channel with the system information is transmitted, and a position in a multi-frame structure, where the UE currently receives a downlink frame. In the NB-TDD communication system, for data exchange, the Node B schedules a predetermined number of 10-ms radio frames, and typically, 64 or 72 radio frames constitute one multi-frame structure. The uplink channel output from the switch 420 is frequency-shifted to a carrier frequency band by an RF processor 422, and then transmitted to the Node B through an antenna 423.

Hitherto, a process for transmitting the uplink channel from the UE to the Node B has been described. Next, a process for receiving a downlink channel from the Node B will be described.

A downlink channel signal received through the antenna 423 is frequency-shifted by the RF processor 422 from the carrier band to the baseband frequency, and then provided to the switch 420. The switch 420 switches ON the signal output from the RF processor 422 and provides its output signal to a demodulator 432 under the control of the controller 421, at a point where an uplink channel signal is to be received. The signal received at the $i^{th}$ UE from the Node B may include DwPTS, and the switch 420 is switched to a DwPTS analyzer 431 at an arrival point of the DwPTS to provide a received DwPTS to the DwPTS analyzer 431. The DwPTS analyzer 431 analyzes the received DwPTS, so that the UE can recognize a position of the broadcasting channel and a position of the currently received downlink frame in the multi-frame structure. The demodulator 432 demodulates the received downlink channel signal in the modulation mode used by the Node B, and provides the demodulated signal to a demultiplexer 433. The demultiplexer 433 demultiplexes the downlink channel signal into a midamble 434 and a downlink user data part. The midamble 434 output from the demultiplexer 433 serves to measure a reception power level of the downlink channel signal transmitted from the Node B, and enable the UE to recognize the type of downlink channel transmitted from the Node B. Therefore, by simply analyzing the midamble 434, it is possible to recognize whether there is data transmitted to the UE.

A multiplier 435 descrambles the downlink user data part output from the demultiplexer 433 by multiplying it by the same scrambling code $C_{SCRAMBLE}$ as that used by the Node B, and provides its output to the despreader 436. The despreader 436 despreads the spread user data and downlink shared channel by multiplying a signal output from the multiplier 435 by the channelization code, an OVSF code, used in the Node B, thereby to extract the downlink user data and the downlink shared channel 437 for transmitting Node B system information or UE control information. When there exists a downlink transmission pause in the downlink shared channel 437, the P-CCPCH is used to set uplink transmission power.

The $i^{th}$ user's data output from the despreader 436 is demultiplexed by a demultiplexer 438 into TPC 439, TFCI 440, SS 470 and pure user data. The TPC command 439 is used to control transmission power of the uplink channel to be transmitted by the $i^{th}$ user's UE, the TFCI 440 is used to analyze the type of the data transmitted from the Node B to the $i^{th}$ user, and the SS 470 is used by the Node B as a command for requesting synchronization control on the uplink channel transmitted by the UE. The $i^{th}$ user's data output from the demultiplexer 438 is deinterleaved by a deinterleaver 441, and then decoded by a decoder 442 as decoded $i^{th}$ user's data 443.

Figure 5:
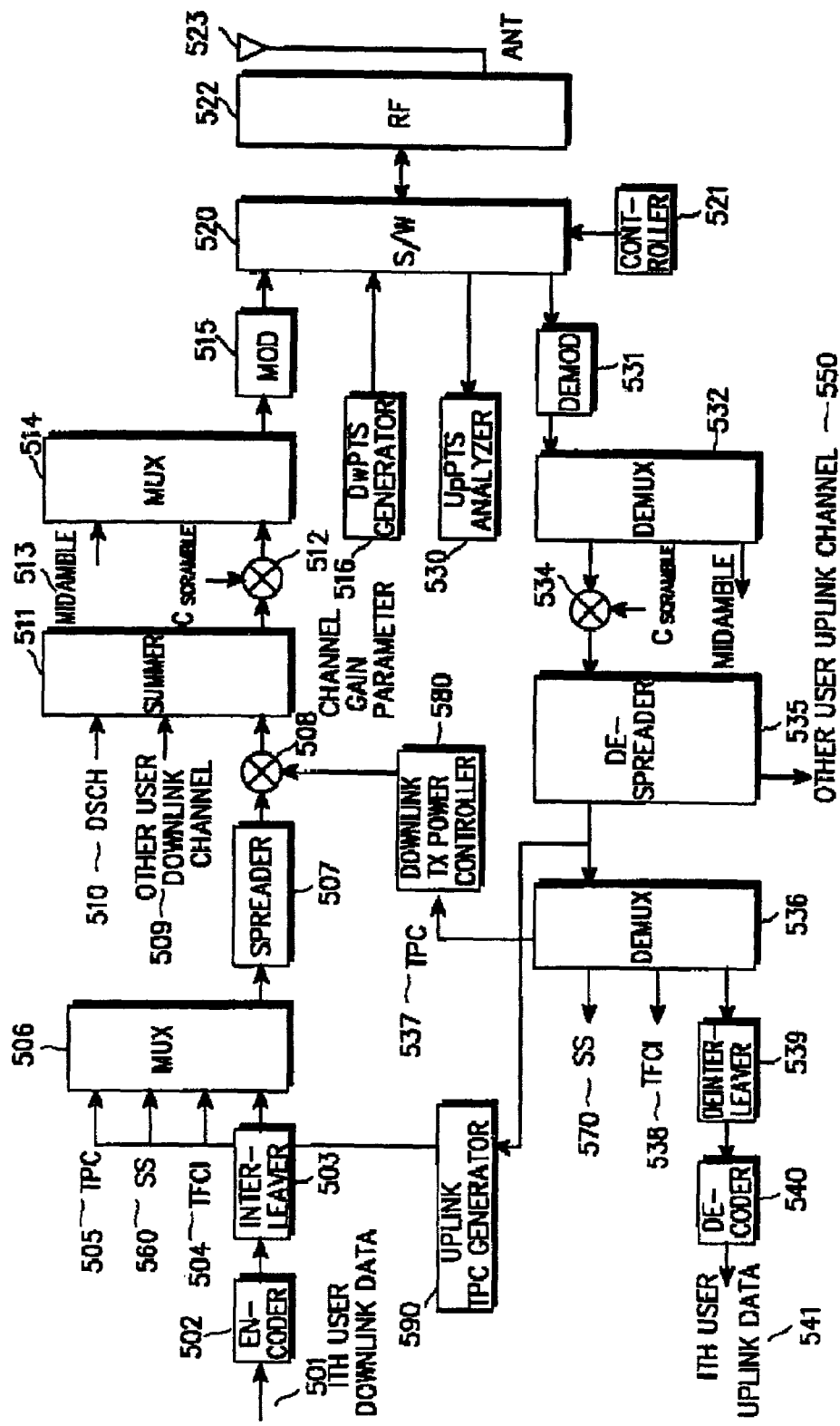
FIG. 5 illustrates a structure of a Node B transceiver according to an embodiment of the present invention.

FIG. 5 illustrates a structure of a Node B transceiver according to an embodiment of the present invention.

First, a process for transmitting downlink channels from the Node B to UEs will be described with reference to FIG. 5. An encoder 502 channel-codes $i^{th}$ user's data 501 to be transmitted to the $i^{th}$ user and provides its output to an interleaver 503. The interleaver 503 interleaves a signal output from the encoder 502 according to a predetermined rule, and provides its output to a multiplexer 506. The multiplexer 506 multiplexes the $i^{th}$ user's data output from the interleaver 503, a TPC command 505 for controlling uplink transmission power of the $i^{th}$ user, TFCI 504 indicating a transport format used for the $i^{th}$ user's data, and SS 560 for requesting synchronization control on the uplink transport channel from the UE, to create an $i^{th}$ user's data part, and then provides the created $i^{th}$ user's data part to a spreader 507. Here, the TPC 505 is created by an uplink TPC command generator 590 by measuring the SIR of an $i^{th}$ user's uplink transport channel output from a despreader 535.

The spreader 507 channel-spreads the $i^{th}$ user's data part with the OVSF code used for the $i^{th}$ user's downlink channel, and provides its output to a multiplier 508. The multiplier 508 multiplies a signal output from the spreader 507 by a channel gain for transmission power of the downlink channel to be transmitted to the $i^{th}$ user, and provides its output to a summer 511. Here, the channel gain is created by a downlink transmission power controller 580 based on a downlink TPC command 537 output from the demultiplexer 536. Upon occurrence of a downlink transmission pause, the downlink transmission power controller 580 resets downlink transmission power to be used at the end point of the downlink transmission pause, using Equation (3).

The summer 511 sums up a downlink shared channel 510, other users' downlink channels 509, and the $i^{th}$ user's channel from multiplier 508, wherein the channels were channel-spread with different OVSF codes, so that the channels may not interfere with the other users' channels summed along with them. A multiplier 512 scrambles the downlink channel signals output from the summer 511 with the scrambling code used by the Node B, and provides its output to a multiplexer 514. The multiplexer 514 multiplexes the downlink channel signals and an input midamble 513 into a downlink channel time slot. The midamble 513 can be used by the UE in measuring a transmission power level of the Node B, and also used in determining the channels transmitted over the downlink channel time slot multiplexed by the multiplexer 514.

A modulator 515 modulates the downlink channel signals output from the multiplexer 514 in a modulation mode such as BPSK (Binary Phase Shift Keying), QPSK, 8PSK or QAM. The modulated downlink channel signals output from the modulator 515 are provided to a switch 520, which is switched to the modulator 515 at a transmission point of the downlink channel slot under the control of a controller 521. The signal output from the switch 520 is provided to an RF processor 522. Further, the switch 520 is switched to a DwPTS generator 516 under the control of the controller 521, to transmit the DwPTS at a transmission point of the DwPTS. The DwPTS is used by the UE in estimating a position of a broadcasting channel with Node B information, a level of a Node B signal, and a position of a currently received frame in the multi-frame structure, during an initial search for the Node B. The RF processor 522 frequency-shifts the downlink channel time slot to a carrier frequency band, and transmits its output signals to the UEs in the Node B through an antenna 523.

Next, a process for receiving uplink signals from the UEs in the Node B will be described with reference to FIG. 5. The RF processor 522 frequency-shifts uplink signals received through the antenna 523 to a base band, and then provides its output to the switch 520. The switch 520, under the control of the controller 521, switches the uplink signals received from the UEs to a demodulator 531 at a specified time. The controller 521 controls the switch 520 by analyzing the points where the UEs in the Node B have transmitted the uplink channel signals, and also switches (or connects) the switch 520 to an UpPTS analyzer 530 at an arrival point of the UpPTS, so as to analyze the UpPTSs transmitted from the respective UEs. The demodulator 531 demodulates the received uplink signal and provides its output to a demultiplexer 532. The demultiplexer 532 demultiplexes the received uplink signal output from the demodulator 531 into a midamble 533 and uplink signal data part. The midamble 533 is used in detecting the users, estimating channel environment between the UEs and the Node B, and estimating a level of the transmission signals from the UEs. The uplink signal data part output from the demultiplexer 532 is descrambled by a multiplier 534 with the same scrambling code as that used in the UE transceiver of FIG. 4. The descrambled uplink signal data part is despread by the despreader 535 into uplink signal data parts of the respective users, and the $i^{th}$ user's uplink signal data part is provided to a demultiplexer 536. The demultiplexer 536 demultiplexes the $i^{th}$ user's uplink signal data part into TPC 537, TFCI 538, SS 570 and $i^{th}$ user's data. The TPC 537 is provided to the downlink transmission power controller 580, and used to control downlink transmission signal power of the $i^{th}$ user. The TFCI 538 is used in analyzing a transport format used for the $i^{th}$ user's data part, and the SS 570 is used in controlling a transmission point of the downlink channel to the UE. The $i^{th}$ user's data output from the demultiplexer 536 is deinterleaved by a deinterleaver 539, and then decoded by a decoder 540 into $i^{th}$ user's data 541. The other users' uplink channels 550 output from the despreader 535 are also received at the Node B in the same process as performed on the $i^{th}$ user's data.

Figure 6:
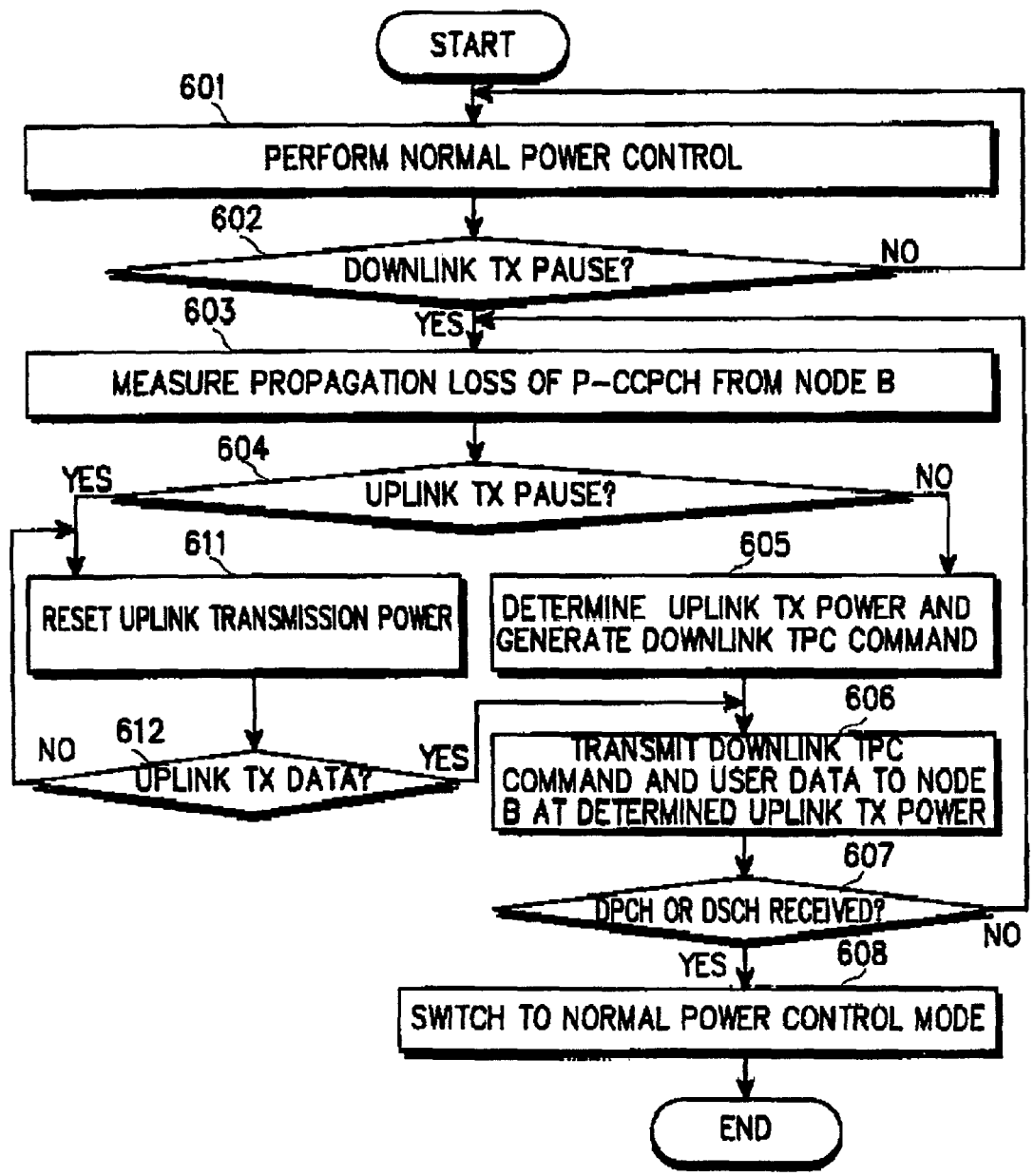
FIG. 6 illustrates an operating procedure of the UE according to an embodiment of the present invention.

FIG. 6 illustrates an operating procedure of the UE according to an embodiment of the present invention. Referring to FIG. 6, in step 601, the UE performs normal uplink/downlink transmission power control, typically using the closed-loop power control method in the NB-TDD communication system. If the UE detects a downlink transmission pause in step 602 during the closed-loop power control, the UE proceeds to step 603. Here, the UE can detect the downlink transmission pause by analyzing an upper layer signaling message transmitted from the Node B, or recognize the downlink transmission pause upon failure to detect a midamble allocated to the UE in a midamble part of the downlink channel transmitted from the Node B.

Upon detecting the downlink transmission pause, the UE measures a propagation loss of the P-CCPCH transmitted from the Node B in step 603, and then proceeds to step 604. Of course, the UE can also measure the propagation loss of the P-CCPCH in step 601. After measuring the propagation loss of the P-CCPCH, the UE determines in step 604 whether an uplink transmission pause has occurred, since the UE operates in two different modes according to whether there exists uplink transmission data. Upon occurrence of the uplink transmission pause in step 604, the UE resets uplink transmission power using the propagation loss of the P-CCPCH, the interference noise $I_{BTS}$ of the Node B and the transmission power of the uplink transmission time slot just before the start of the downlink transmission pause in step 611, and then proceeds to step 612. Here, the uplink transmission power resetting process is performed in the same manner as described in the embodiments of the present invention. In step 612, the UE determines whether there exists uplink transmission data. If there exists no uplink transmission data, the UE returns to step 611. Otherwise, the UE proceeds to step 606.

If there exists uplink transmission data in step 604, the UE proceeds to step 605 where it determines uplink transmission power and creates a downlink TPC command. Here, the downlink TPC command is transmitted to from the UE to the Node B, and then used by the Node B in determining transmission power of the downlink channel to be used immediately after the downlink transmission pause, i.e., setting the initial transmission power of the downlink channel. In step 606, the UE transmits the downlink TPC command determined in step 605 or 611 and the user data to the Node B at the determined uplink transmission power. In step 607, the UE determines whether a downlink dedicated channel or a downlink shared channel is received from the Node B. As the result of the determination, if no downlink dedicated channel or downlink shared channel is received, the UE returns to step 603. However, upon receiving the downlink dedicated channel or shared channel from the Node B, the UE controls the downlink transmission power in a normal power control mode, i.e., in a closed-loop power control mode, in step 608.

Figure 7:
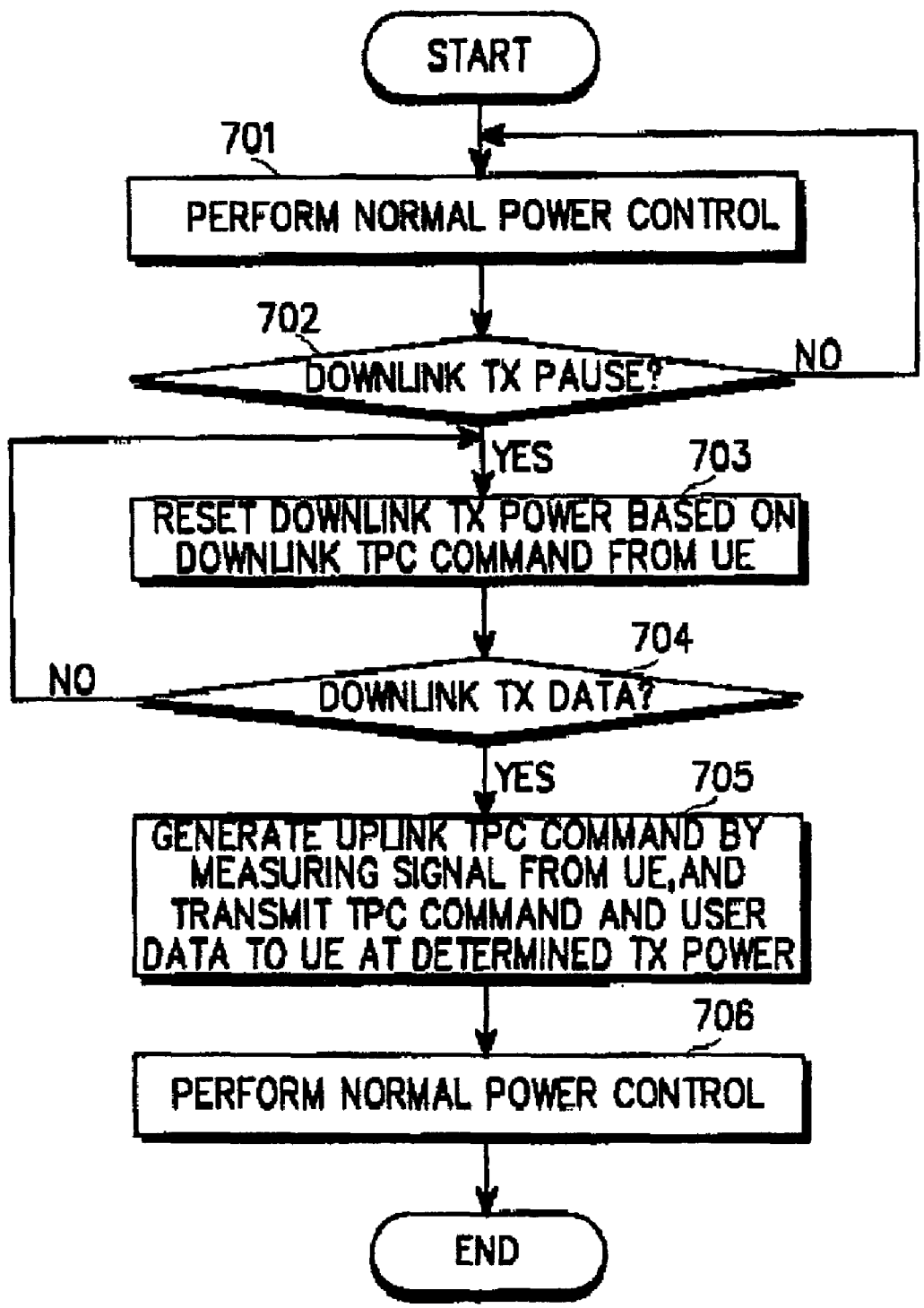
FIG. 7 illustrates an operating procedure of the Node B according to an embodiment of the present invention.

FIG. 7 illustrates an operating procedure of the Node B according to an embodiment of the present invention. Referring to FIG. 7, in step 701, the Node B controls uplink/downlink transmission power in a normal power control mode, i.e., in the closed-loop power control mode, a typical power control mode in the NB-TDD communication system. Since the Node B operates in two different modes according to whether there exists a downlink transmission pause during the normal uplink/downlink transmission power control operation, the Node B determines in step 702 whether a downlink transmission pause occurs. Upon occurrence of the downlink transmission pause, the Node B resets downlink transmission power using a downlink TPC command received from the UE in step 703, and then proceeds to step 704. However, when no downlink transmission pause occurs in step 702, the Node B returns to step 701. The Node B determines in step 704 whether there exists downlink transmission data. As the result of the determination, if there is no downlink transmission data, the Node B returns to step 703, and otherwise, if there exists downlink transmission data, the Node B proceeds to step 705. In step 705, the Node B generates an uplink TPC command by measuring a power level of a signal received from the UE, and transmits the uplink TPC command and the user data to the UE at the transmission power determined in step 703. Thereafter, in step 706, the Node B controls the uplink/downlink transmission power again in the normal transmission power control mode.

As described above, the NB-TDD communication system according to the present invention uses the closed-loop power control method together with the open loop power control method for uplink transmission power control upon occurrence of the uplink/downlink transmission pause, thus contributing to efficient power control. In addition, when a special transmission/reception technique such as beam forming is applied, the NB-TDD communication system can efficiently control uplink/downlink transmission power considering a characteristic difference between the channels subjected to beam forming and the channels not subjected to beam forming, thereby making it possible for both the Node B and the UE to set their proper initial transmission power at the end of the transmission pause.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmission power control method in a UE (User Equipment) for a TDD (Time Division Duplexing) CDMA (Code Division Multiple Access) communication system which transmits a stream of frames from a Node B to the UE, each of the frames including a field indicating power level information transmitted from the Node B and a time slot field for allocating a TPC (Transmission Power Control) command and transmission data from the Node B to the UE, wherein the UE receives data transmitted from the Node B, allocated to a time slot field in a following frame after a transmission pause period where no transmission data exists in the time slot fields in specific frames among the stream of frames transmitted from the Node B to the UE, comprising the steps of:

measuring a propagation loss between the Node B and the UE by receiving the power level information at a specific time slot in the transmission pause period;

measuring an interference noise of the Node B by receiving a specific channel signal broadcast by the Node B;

determining uplink transmission power by summing up (i) values determined by applying a weight based on a length of the transmission pause period to the currently measured propagation loss and an average propagation loss between the Node B and the UE during the transmission pause period, (ii) a predetermined target signal-to-interference ratio (SIR), (iii) the measured interference noise of the Node B, and (iv) an offset for compensating for the propagation loss error; and transmitting a TPC command corresponding to the determined uplink transmission power to the Node B.

2. The transmission power control method as claimed in claim 1, further comprising the step of determining by the Node B downlink transmission power upon receipt of the TPC command, considering (i) downlink transmission power transmitted at a time slot just before the transmission pause period in the following frame, (ii) the received TPC command and (iii) a power control step to be applied to a corresponding time slot in the following frame.

3. The transmission power control method as claimed in claim 1, wherein the specific channel is a broadcasting channel.

4. A transmission power control method in a UE for a TDD CDMA communication system which transmits a stream of frames from a Node B to the UE, each of the frames including a field indicating power level information transmitted from the Node B and a time slot field for allocating a TPC command and transmission data from the Node B to the UE, wherein the UE receives data transmitted from the Node B, allocated to a time slot field in a following frame after a transmission pause period where no transmission data exists in the time slot fields in specific frames among the stream of frames transmitted from the Node B to the UE, comprising the steps of:

measuring a first propagation loss between the Node B and the UE by receiving the power level information at a specific time slot in the transmission pause period;

detecting an offset determined considering (i) uplink transmission power used at a time slot just before the transmission pause period, (ii) a second propagation loss between the Node B and the UE at the time slot just before the transmission pause period, (iii) a TPC command received from the Node B at the time slot just before the downlink transmission pause period, and (iv) a change in channel environment between the Node B and the UE; and determining first uplink transmission power by summing up (a) the uplink transmission power used at the time slot just before the transmission pause period, (b) a value determined by subtracting the second propagation loss from the first propagation loss, and (c) the offset.

5. The transmission power control method as claimed in claim 4, further comprising the steps of:

measuring a first interference noise of the Node B by receiving a specific channel signal broadcast from the Node B at the specific time slot while measuring the first propagation loss;

measuring a second interference noise of the Node B at the time slot just before the transmission pause period, after measuring the first interference noise; and determining second uplink transmission power by summing up (i) the uplink transmission power, (ii) the value determined by subtracting the second propagation loss from the first propagation loss, (iii) the offset and (iv) a value determined by subtracting the second interference noise from the first interference noise.

6. The transmission power control method as claimed in claim 4, further comprising the steps of:
 measuring an interference noise of the Node B by receiving a specific channel signal broadcast from the Node B at the specific time slot; and
 determining third uplink transmission power considering a value determined by summing up (i) values determined by applying a weight based on a length of the transmission pause period to the currently measured first propagation loss and an average propagation loss between the Node B and the UE during the transmission pause period, (ii) a predetermined target SIR and (iii) an offset for compensating for the propagation loss error, and also considering another weight based on the length of the transmission pause period for the first uplink transmission power.

7. The transmission power control method as claimed in claim 4, further comprising the step of, when only a time slot transmitting the data is subjected to beam forming, determining fourth uplink transmission power by summing up (i) uplink transmission power transmitted at the time slot just before the transmission pause period, (ii) a value determined considering compensation for a propagation loss difference between a time slot field subjected to beam forming and a time slot field not subjected to beam forming on a value determined by subtracting the second propagation loss from the first propagation loss, and (iii) the offset.

8. The transmission power control method as claimed in claim 5, further comprising the steps of:
 measuring an interference noise of the Node B by receiving a specific channel signal broadcast from the Node B at the specific time slot; and
 determining fifth uplink transmission power considering a value determined by summing up (i) values determined by applying a weight based on a length of the transmission pause period to the currently measured first propagation loss and an average propagation loss between the Node B and the UE during the transmission pause period, (ii) a predetermined target SIR, and (iii) an offset for compensating for the propagation loss error, and also considering another weight based on the length of the transmission pause for the second uplink transmission power.

9. The transmission power control method as claimed in claim 5, further comprising the step of, when only a time slot transmitting the data is subjected to beam forming, determining sixth uplink transmission power by summing up (i) uplink transmission power transmitted at the time slot just before the transmission pause period, (ii) a value determined considering compensation for a propagation loss difference between a time slot field subjected to beam forming and a time slot field not subjected to beam forming on a value determined by subtracting the second propagation loss from the first propagation loss, (iii) the offset, and (iv) a value determined by subtracting the second interference noise from the first interference noise.

10. The transmission power control method as claimed in claim 6, wherein the specific channel is a broadcasting channel.

11. A transmission power control apparatus in a UE for a TDD CDMA communication system which transmits a stream of frames from a Node B to the UE, each of the frames including a field indicating power level information transmitted from the Node B and a time slot field for allocating a TPC command and transmission data from the Node B to the UE, wherein the UE receives data transmitted from the Node B, allocated to a time slot field in a following frame after a transmission pause period where no transmission data exists in the time slot fields in specific frames among the stream of frames transmitted from the Node B to the UE, comprising:
 an uplink transmission power controller for, upon occurrence of the transmission pause from a specific channel signal received from the Node B, measuring a propagation loss between the Node B and the UE based on power level information received at a specific time slot in the transmission pause period, detecting an interference noise of the Node B from the specific channel signal, and determining uplink transmission power by summing up (i) values determined applying a weight based on a length of the transmission pause period to the currently measured propagation loss and an average propagation loss between the Node B and the UE during the transmission pause period, (ii) a predetermined target SIR, and (iii) an offset for compensating for the propagation loss error;
 a downlink TPC command generator for generating a downlink TPC command for controlling downlink transmission power to be transmitted by the Node B at the following frame by receiving uplink transmission power determined by the uplink transmission power controller;
 a multiplexer for multiplexing the downlink TPC command, user data to be transmitted to the Node B, and TFCI (Transport Format Combination Indicator) indicating a type and a data rate of the user data; and
 a multiplier for multiplying the uplink channel signal by a channel gain based on the determined uplink transmission power.

12. The transmission power control apparatus as claimed in claim 11, wherein the uplink transmission power controller determines the uplink transmission power by measuring a first propagation loss between the Node B and the UE based on power level information received at a specific time slot during the transmission pause period, detecting an offset based on uplink transmission power used at the time slot just before the transmission pause period, a second propagation loss between the Node B and the UE at the time slot just before the transmission pause period, a TPC command received from the Node B at the time slot just before the transmission pause period, and a change in channel environment between the Node B and the UE, and then summing up (i) uplink transmission power used at the time slot just before the transmission pause period, (ii) a value determined by subtracting the second propagation loss from the first propagation loss, and (iii) the offset.

13. A transmission power control apparatus of a Node B in a UE for a TDD CDMA communication system which transmits a stream of frames from a Node B to the UE, each of the frames including a field indicating power level information transmitted from the Node B and a time slot field for allocating a TPC command and transmission data from the Node B to the UE, wherein the Node B transmits data to the UE in a following frame after a transmission pause period where no transmission data exists in the time slot fields in specific frames among the stream of frames transmitted from the Node B to the UE, comprising:
 a demultiplexer for demultiplexing an uplink channel signal received from the UE into a downlink TPC command, user data from the UE, and TFCI indicating a type and a data rate of the user data;

a downlink transmission power controller for determining downlink transmission power for the UE based on the downlink TPC command, upon detecting an occurrence of transmission pause;

an uplink TPC generator for generating an uplink TPC command for controlling uplink transmission power to be transmitted to the UE at the following frame by receiving uplink transmission power determined by the downlink transmission power controller;

a multiplexer for multiplexing the generated uplink TPC command, the user data to be transmitted to the UE, and TFCI indicating a type and a data rate of the user data; and a multiplier for multiplying the downlink channel signal by a channel gain based on the determined downlink transmission power.

* * * * *

UNITED STATES PATENT AND TRADEMARK OFFICE
CERTIFICATE OF CORRECTION

PATENT NO. : 7,082,108 B2 Page 1 of 1
APPLICATION NO. : 10/046881
DATED : July 25, 2006
INVENTOR(S) : Sung-Oh Hwang et al.

It is certified that error appears in the above-identified patent and that said Letters Patent is hereby corrected as shown below:

Title page, Item (75) Inventors:

"Kook-Heul Lee" should be --Kook-Heui Lee--.

Signed and Sealed this

Second Day of January, 2007

JON W. DUDAS
*Director of the United States Patent and Trademark Office*